United States Patent [19]

Dave et al.

[11] Patent Number: 4,889,726
[45] Date of Patent: * Dec. 26, 1989

[54] USING COCOA POWDER TO ENHANCE THE FLAVOR OF A MINT FLAVORED CHEWING GUM

[75] Inventors: Jayant C. Dave, Bloomingdale; David W. Record, River Forest; Jill M. Nespor, LaGrange; Jeffrey S. Hook, Palos Hills, all of Ill.

[73] Assignee: Wm. Wrigley Jr. Company, Chicago, Ill.

[*] Notice: The portion of the term of this patent subsequent to Dec. 26, 2006 has been disclaimed.

[21] Appl. No.: 240,833

[22] Filed: Sep. 2, 1988

[51] Int. Cl.$^4$ ............................................. A23G 3/30
[52] U.S. Cl. ........................................ 426/3; 426/6; 426/631; 426/650
[58] Field of Search .................... 426/3, 4, 5, 6, 631, 426/593

[56] References Cited

U.S. PATENT DOCUMENTS

| | | |
|---|---|---|
| 1,206,467 | 11/1916 | Reid . |
| 1,786,831 | 12/1930 | Dellenbarger . |
| 2,224,637 | 12/1940 | Mahle ................................. 99/135 |
| 2,366,589 | 1/1945 | Borglin ............................... 260/100 |
| 3,062,662 | 11/1962 | McDonald ........................... 99/138 |
| 3,826,847 | 7/1974 | Ogawa et al. ........................ 426/3 |
| 4,224,345 | 9/1980 | Tezuka et al. ........................ 426/3 |
| 4,514,423 | 4/1985 | Tezuka et al. ........................ 426/3 |
| 4,604,287 | 8/1986 | Glass et al. .......................... 426/5 |
| 4,758,444 | 7/1988 | Terauchi et al. ................... 426/593 |

Primary Examiner—Donald E. Czaja
Assistant Examiner—Evan Federman
Attorney, Agent, or Firm—Willian Brinks Olds Hofer Gilson & Lione

[57] ABSTRACT

The present invention includes a method of enhancing the flavor of a mint flavored chewing gum by the addition of a minor amount of cocoa powder, as well as the chewing gum so produced. The amount of cocoa powder is selected so as to cause the flavor enhancement and so as to not impart a detectable chocolate flavor to the chewing gum. The level of cocoa powder added is between about 0.08 and 0.5 percent by weight of the chewing gum.

16 Claims, No Drawings

USING COCOA POWDER TO ENHANCE THE FLAVOR OF A MINT FLAVORED CHEWING GUM

BACKGROUND OF THE INVENTION

The present invention relates to chewing gum and methods for producing it. More particularly, the invention relates to an enhancement of the flavor profile of mint flavored chewing gum.

Of all the flavors incorporated into chewing gum, mint flavors have been some of the most popular. Most widely used have been peppermint and spearmint as well as blends of the two. Typically, peppermint and spearmint flavors are added to chewing gum in the form of essential oils. Oil of peppermint is derived by distillation of the aerial parts of the perennial herb *Mentha piperita* L. Oil of Cornmint, which is derived from *Mentha arvensis* L. var *piperescens*, can be blended with pepermint oil. Oil of Spearmint is derived from distillation of several species and varieties of the genus Mentha. The principle species and varieites are *Mentha spicata* L. and *Mentha verticillata*, and *Mentha cardiaca*.

The flavor profiles of these mints in chewing gum are somewhat complex. Accordingly, much research has been carried out to optimize the flavor effects of these mints. For example, U.S. Pat. No. 4,613,513 discloses a process wherein essential oils such as spearmint oil and peppermint oil are treated with a small amount of a mild oxidizing agent, a Fehlings solution, to remove harsh flavor notes. Similarly, U.S. Pat. No. 4,708,880 describes a process wherein harsh flavor notes are removed from pepermint and spearmint oil by treatment with a peroxide-acid reagent.

A flavor enhancer for mint flavored chewing gums is described in European Patent Application No. 87810165. This reference discloses a flavor enhancer comprising a derivative of soy which is reported to reduce the bitter or harsh flavor notes perceived after substantial chewing.

European Patent Application No. 87810601 discloses a method of enhancing the perceived breath freshening effects of a mint flavored chewing gum. The disclosed composition includes peppermint and/or spearmint oil with a specified menthol content; a spray dried peppermint and/or spearmint oil; and spray dried menthol.

SUMMARY OF THE INVENTION

The present invention includes a method of enhancing the flavor of a mint flavored chewing gum by the addition of a minor amount of cocoa powder to the chewing gum. The invention also includes the mint flavored chewing gum with cocoa powder added in a minor amount. The chewing gum of the present invention includes a gum base, a sweetener, a mint flavoring agent, and a minor amount of cocoa powder. The amount of cocoa powder is between about 0.08 and 0.5 percent by weight of the chewing gum.

In accordance with a preferred method, the cocoa powder is first blended with a softener, such as glycerine, to produce a cocoa powder-containing syrup. Also in this preferred embodiment, the mint flavoring agent is a blend of natural spearmint oils which is included at a level of between about 0.4 and about 2.0 percent of the chewing gum. Alternatively, the mint flavoring agent can be a blend of natural peppermint oils, or a blend including both natural peppermint oils and natural spearmint oils.

At the relatively low level at which the cocoa powder is used in the present invention, it should not contribute a chocolate flavor to the chewing gum. However, it has been found that at this low level the cocoa powder contributes to the overall flavor of the mint flavored chewing gum in such a way as to enhance the mint flavor of the chewing gum. In particular, the enhancement has been described as making the mint taste stronger, fuller, richer and more honey-like.

As used in this specification and the appended claims, the term "mint flavored chewing gum" is intended to refer to a chewing gum which has a mint flavor as its dominant flavor.

Unless otherwise noted, all percentages in this specification and the appended claims are percentages by weight of the total chewing gum formulation.

DETAILED DESCRIPTION OF THE PREFERRED EMBODIMENTS

The mint flavored chewing gum of the present invention includes a gum base, a sweetener, a mint flavoring agent, and a minor amount of cocoa powder.

The cocoa powder used in the present invention can be any of the various types. Preferably, the cocoa powder is made according to the Dutch process wherein the nib is soaked in a warm alkali solution before being ground and pressed.

The fat and moisture content of the cocoa powder is seen as noncritical to the present invention so long as the fat and moisture added through the cocoa do not interfere with the texteral properties of the gum.

A cocoa powder suitable for use in the most preferred embodiment is obtained from the Blommer Chocolate Co. of Chicago, Ill. under the designation "Sudan Dutch Process Cocoa." This particular cocoa powder has a fat content of 10–12 percent. Another supplier of suitable cocoa powder is Gil & Duffus Products, Inc.

As discussed in connection with Examples 3–6 below, it has been found that the cocoa powder received from the manufacturer can be roasted or cooked it before being incorporated into the chewing gum. In particular, it has been found that the cocoa powders develop a stronger, richer cocoa taste if they are roasted or cooked. As a result, less cooked cocoa powder may be needed to produce the same flavor enhancing effect. Accordingly, in some embodiments, it may be desirable to cook the cocoa powder at between about 220° F. and about 260° F. for between about 2 and about 60 minutes before it is incorporated into the chewing gum. More preferably, the cocoa powder is cooked at a temperature between about 240° F. and about 250° F. for between about 5 and about 15 minutes. Most preferably, the cocoa powder is cooked at 240° F. for about 10 minutes.

According to the most preferred embodiment, the cocoa powder is not cooked before being incorporated into the chewing gum for reasons of convenience.

The amount of cocoa powder added to the mint flavored chewing gum should be between about 0.08 and about 0.5 percent. This range is important to the present invention. In particular, it is important that the amount of cocoa powder be kept below the level at which it would impart a noticeable chocolate flavor to the chewing gum. It is also important that the amount of cocoa be above a level at which the flavor enhancement effect is detectable. Preferably, the level of cocoa powder is between about 0.2 and about 0.4 percent. Most preferably, the level of cocoa powder is about 0.3 percent.

The cocoa powder can be added to the mint flavored chewing gum at any point during its formulation. Although the cocoa powder can be added during formulation of the gum base, it is preferred to add it with the remainder of the chewing gum ingredients.

Preferably, the cocoa powder is first added to a quantity of a liquid, such as a softener, that is to be added to the chewing gum formulation. The cocoa powder is preferably well blended with the liquid to produce a cocoa powder-containing syrup. This syrup can then be added as a liquid ingredient during formulation of the chewing gum. This method is preferred for reasons of convenience in measuring. This method is also preferred for getting the cocoa powder evenly dispersed throughout the other chewing gum ingredients.

The liquids with which the cocoa powder can be pre-blended include softeners such as glycerine, oils, propylene glycol, as well as combinations thereof. Of these, glycerine is most preferred. Preferably, the pre-blend includes 2 parts cocoa powder and 3 parts softener.

Chewing gum bases generally comprise a combination of elastomers and resins together with plasticizers and inorganic fillers.

The gum base may contain natural gums and/or synthetic elastomers and resins. Natural gums include both elastomers and resins. Suitable natural gums include, but are not limited to chicle, jellutong, sorva, nispero tunu, niger gutta, massaranduba belata, and chiquibul.

When no natural gums are used, the gum base is referred to as "synthetic" and the natural gums are replaced with synthetic elastomers and resins. Synthetic elastomers may include polyisoprene, polyisobutylene, isobutylene-isoprene copolymer, styrene butadiene rubber, and the like. Of these, polyisoprene, isobutylene and isobutylane-isoprene copolymer are preferred, with the copolymer being the most preferred. A copolymer obtained from Exxon Corp. under the designation "butyl rubber" is suitable for use in the most preferred embodiment.

The amount of elastomer used in the gum base can typically be varied between about 10 and about 20 percent depending on the specific elastomer selected and on the physical properties desired in the final gum base. For example, the viscosity, softening point, and elasticity can be varied.

Resins used in gum bases include polyvinyl acetate, polyethylene, ester gums, (resin esters of glycerol) and polyterpenes. Of these, polyterpenes, polyethylene, and polyvinyl acetate are preferred, with a combination of polyvinyl acetate and polyterpenes being most preferred. A polyvinyl acetate obtained from MONSANTO under the designation "Gelva" is a suitable polyvinyl acetate for use in the most preferred embodiment. A polyterpene obtained from HERCULES under the designation "Piccolyte" is suitable for use in the most preferred embodiment.

As with the elastomer, the amount of resin used in the gum base can be varied depending on the particular resin selected and on the physical properties desired in the final gum base.

Preferably, the gum base also includes plasticizers selected from the group consisting of fats, oils, waxes, and mixtures thereof. The fats and oils can include tallow, hydrogenated and partially hydrogenated vegetable oils, and cocoa butter. Commonly employed waxes include paraffin, microcrystalline and natural waxes such as beeswax and carnauba.

The most preferred embodiment uses a mixture of paraffin wax and partially hydrogenated vegetable oil and glycerol monostearate.

The amount of plasticizers used can vary between about 10 and about 40 percent. In the most preferred embodiment, the plasticizer includes paraffin wax at about 13 percent and cottonseed oil at about 2 percent, and glycerol monostearate at about 5 percent.

Preferably, the gum base also includes a filler component. The filler component is preferably selected from the group consisting of calcium carbonate, magnesium carbonate, talc, dicalcium phosphate and the like. The filler may constitute between about 5 to about 60 percent by weight of the gum base. Preferably, the filler comprises about 5 to about 50 percent by weight of the gum base.

Further, gum bases may also contain optional ingredients such as antioxidants, colors, and emulsifiers.

These ingredients of the gum base can be combined in a conventional manner. In particular, the elastomer, resins, plasticizers, and the filler are typically softened by heating and then mixed for a time sufficient to insure a homogenous mass. The mass can be formed into slabs, or pellets and allowed to cool before use in making chewing gum. Alternatively, the molten mass can be used directly in a chewing gum making process.

Typically, the gum base constitutes between about 5 to about 95 percent by weight of the gum. More preferably the insoluble gum base comprises between 10 and 50 percent by weight of the gum and most preferably about 20 to about 35 percent by weight of the gum.

In general, a chewing gum composition typically comprises a water soluble bulk portion added to the water insoluble chewable gum base portion. The flavoring agents are typically water insoluble. The water soluble portion dissipates with a portion of the flavoring agent over a period of time during chewing, while the gum base portion is retained in the mouth throughout the chew.

The water soluble portion of the chewing gum may further comprise softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in the chewing gum. Preferably, the chewing gum contains about 1 percent glycerine.

Sugar sweeteners generally include saccharide containing components commonly known in the chewing gum art which comprise but are not limited to sucrose, dextrose, maltose, dextrin, dried invert sugar, fructose, levulose, galactose, corn syrup solids, and the like, alone or in any combination. In the preferred embodiment, the water soluble sweetener portion is a mixture of sugar at about 50 percent of the final chewing gum, dextrose monohydrate at about 10 percent, and corn syrup at about 17 percent.

In alternative embodiments, the invention can be used in a sugarless chewing gum. Generally sugarless sweeteners include components with sweetening characteristics but are devoid of the commonly known sugars and comprise but are not limited to high-potency sweeteners and/or sugar alcohols. Suitable high-potency sweeteners include aspartame, alitame, salts of acesulfame, saccharin and its salts, cyclamic acid and its salts, glycyrrhizin, surcralose, thaumatin, and monellin, as well as combinations thereof. Suitable sugar alcohols include sorbitol, mannitol, xylitol, hydrogenated starch hydrolysates, maltitol, and the like, as well as combinations thereof. Preferably, the sugarless gum comprises a combination of a high-potency sweetener with a sugar alcohol, most preferably aspartame with sorbitol.

According to the present invention, the chewing gum includes a mint flavoring agent to give the gum a mint taste. Typically, the overall mint flavoring agent content of the chewing gum will range from about 0.1 to about 10.0 weight percent and preferably from about 0.4 to about 3.0 weight percent of the gum.

The mint flavoring agents preferably comprise blends of natural peppermint oils and/or spearmint oils. Alternatively, the mint flavoring agents used in the invention can comprise blends which include synthetic components, such as synthetic menthol, synthetic carvone, and the like. In the most preferred embodiment, the mint flavoring agent is a blend of natural spearmint oils added at about 0.6 percent by weight of the chewing gum.

Other, non-mint flavoring agents and adjuvants can also be added to the chewing gum of the present invention. For example, oils of anise, eucalyptus, clove and cinnamon. Also, flavor chemicals such as furanones which give a caramel flavor note can be added. Those skilled in the art will recognize that natural and artificial flavoring agents may be combined in any sensorally acceptable blend. All such flavors and flavor blends which result in a mint flavored gum are contemplated by the present invention.

Optional ingredients such as colors, emulsifiers and pharmaceutical agents may be added to the chewing gum.

In general, chewing gum is manufacture by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time along with syrup and a portion of bulking agent. Further portions of the bulking agent may then be added to the mixer. The flavoring agent is typically added with the final portion of the bulking agent.

The entire mixing procedure typically takes from five to fifteen minutes, but longer mixing times may sometimes be required. Those skilled in the art will recognize that many variations of the above described procedure may be followed.

EXAMPLES

Examples 1 and 2

Example 1 and comparative Example 2 were carried out to make a taste comparison between a spearmint flavored chewing gum with a minor amount of cocoa powder and a chewing gum without. These two examples had the following formulae:

|  | Wt. % Ex. 1 | Comp. Ex. 2 |
| --- | --- | --- |
| Synthetic base | 20.7 | 20.7 |
| Sucrose | 50.5 | 50.8 |
| Dextrose monohydrate | 10.1 | 10.1 |
| Corn syrup | 16.9 | 16.9 |
| Glycerine | 0.9 | 0.9 |
| Spearmint flavor | 0.6 | 0.6 |
| Cocoa powder | 0.3 | — |
| Total | 100.0 | 100.0 |

The cocoa powder was added to Example 1 and the other examples by the preferred procedure described above. In particular, cocoa powder was mixed in a 2:3 ratio with glycerine and then blended until a thick syrup resulted. This cocoa powder/glycerine syrup was then added to the remainder of the ingredients. In Example 1, the cocoa powder/glycerine syrup was added to 0.75 percent of the formula to thereby produce the 0.3 percent level of cocoa powder and half of the 0.9 g percent level of glycerine.

The cocoa powder used in these examples was a Dutch cocoa obtained from the BLOMMER CHOCOLATE CO. under the designation "Sudan Dutch Process Cocoa". The glycerine was obtained from PROCTOR & GAMBLE under the designation "Star".

The dextrose monohydrate used in these examples was obtained from the A. E. STALEY CO. The corn syrup used in this formulation had a Dextrose Equivalent of 39 g and was also obtained from the A. E. STALEY Co. The spearmint flavoring agent was a blend of natural spearmint oils that are conventional in the flavor industry.

The synthetic base used in these and the following examples had the following formula:

|  | wt. % |
| --- | --- |
| Polyvinyl acetate | 27 |
| Synthetic rubber | 12 |
| Paraffin wax | 13 |
| Cottonseed Oil | 2 |
| Glycerol Monostearate | 5 |
| Terpene resin | 27 |
| Calcium Carbonate filler | 11 |
| Lecithin | 3 |
|  | 100% |

A panel of three chewing gum experts was used to evaluate the flavor effect of the minor amount of cocoa powder. Each of the panelists described the chewing gum with cocoa powder to have a stronger, richer, fuller spearmint flavor that was more syrupy, honey-like, and to have more carvone character.

Examples 3–6

Examples 3–6 were conducted to determine the effect of cooking the cocoa powder before adding it to the chewing gum formulation. Dutch cocoa powder of the same type used in Example 1, was cooked on a hot plate at approximately 260° F. The cocoa powder was observed to become darker in color the longer it was heated. Portions were removed from the heat at the following times. The cocoa powder used in Example 3 had been cook ed for approximately 2 minutes. The cocoa powder used in Example 4 had been cooked for approximately 4 minutes. The cocoa powder used in Example 5 had been cooked for approximately 6 minutes. The cocoa powder used in Example 6 had been cooked for approximately 8 minutes.

Each of these portions was mixed in a 2:3 ratio with glycerine as described above and the resultant syrup was added at the same level to the same chewing gum formulation described in Example 1, i.e. to give 0.3 percent cocoa powder.

The same panel of chewing gum experts evaluated the chewing gum of Examples 3-6. Results showed that the chewing gum of each of the examples possessed a fuller, richer, and enhanced spearmint flavor. The results also showed Examples 5 and 6 produced the most mint flavor enhancement. Accordingly, it is concluded that the cocoa powder contributed more enhancement to the spearmint flavor the longer it was cooked. Cocoa flavors develop more strongly as the cocoa powder is cooked or roasted. This is beneficial in that it allows a lesser amount of cocoa powder to be used to achieve the same mint flavor enhancement.

Examples 7 and 8

Example 7 and comparative Example 8 were carried out to determine the flavor enhancement of cocoa powder on a peppermint flavored chewing gum. Batches of peppermint chewing gum were made with the following formulae:

|  | Ex. 7 | Comp. Ex. 8 |
|---|---|---|
| Synthetic base | 20.2 | 20.2 |
| Sucrose | 54.1 | 54.4 |
| Dextrose monohydrate | 9.9 | 9.9 |
| Corn syrup | 13.3 | 13.3 |
| Glycerine | 1.3 | 1.3 |
| Peppermint flavor | 0.9 | 0.9 |
| Cocoa powder | 0.3 | — |
| Total | 100.0 | 100.0 |

A taste evaluation by the same panel of experts showed that the addition of cocoa powder to Example 7 produced a stronger, enhanced peppermint flavor. The enhanced flavor was described as being richer and fuller in character.

Examples 9-12

Examples 9-12 were performed to determine the effective levels of cocoa powder in a mint flavored chewing gum. In particular, batches of peppermint flavored gum were made with the same formula as shown in Example 7 with the exception that the cocoa powder was added, via the cocoa powder/glycerine syrup, to levels of 0.08, 0.16, 0.40, and 0.52 percent cocoa powder respectively.

Chewing gum from Examples 9-12 were evaluated by a panel of six chewing gum experts who were asked to rate whether the chewing gum had an enhanced flavor as compared to the chewing gum made in comparative Example 8. The following table shows the results:

| Panelist | Ex. 9 0.08% | Ex. 10 0.16% | Ex. 11 0.40% | Ex. 12 0.52% |
|---|---|---|---|---|
| A | N | Y | Y | N-C |
| B | N | Y | N | U-C |
| C | N | Y | Y | N-C |
| D | Y | Y | Y | Y |
| E | Y | Y | Y | U-C |
| F | Y | Y | Y | Y |

Y = Panelist noted that the peppermint flavor of the gum of the example was enhanced as compared to the chewing gum of Example 8.
N = Panelist noted that the peppermint flavor of the gum of the example was not enhanced.
U = Panelist did not state a preference.
c = Panelist noted a slight chocolate flavor.

These results show that the cocoa powder produced an enhancement in the mint flavor of the gum as low as 0.08 percent. Also, at about 0.52 percent, some of the chewing gum experts denoted a chocolate taste. Accordingly, the maximum amount of cocoa powder should be about 0.5 percent by weight of the chewing gum.

In summary, a relatively simple and inexpensive method for enhancing the flavor of a mint flavored chewing gum has been described. Although specific embodiments and examples have been described herein, it should be borne in mind that these have been provided by way of explanation and illustration and that the present invention is not limited thereby. Certainly modifications which are within the ordinary skill in the art to make are considered to lie within the scope of the invention as defined by the following claims, including all equivalents.

I claim:

1. A non-chocolate flavored, mint-flavored chewing gum comprising:
   gum base;
   sweetener;
   a mint flavoring agent; and
   between about 0.08 and about 0.5 percent cocoa powder.

2. The chewing gum of claim 1 wherein the cocoa powder is present in an amount between about 0.2 and about 0.4 percent.

3. The chewing gum of claim 1 wherein the cocoa powder is present at about 0.3 percent.

4. The chewing gum of claim 1 wherein the mint flavoring agent is selected from the group consisting of natural peppermint oil, natural spearmint oil, and combinations thereof.

5. The chewing gum of claim 1 wherein the sweetener is a high-potency sweetener selected from the group consisting of aspartame, alitame, salts of acesulfame, saccharin and its salts, cyclamic acid and its salts, glycyrrhizin, sucralose, thaumatin, and monellin, as well as combinations thereof.

6. The chewing gum of claim 5 further comprising a sugar alcohol selected from the group consisting of sorbitol, mannitol, maltitol, xylitol, hydrogenated starch hydrolysates, and mixtures thereof.

7. The chewing gum of claim 1 further comprising a sugar alcohol selected from the group consisting of sorbitol, mannitol, maltitol, xylitol, hydrogenated starch hydrolysates, and mixtures thereof.

8. A method of making non-chocolate flavored, mint flavored chewing gum comprising the steps of:
   providing a quantity of chewing gum base;
   adding a water soluble portion comprising at least a sweetener;
   adding a mint flavoring agent;

adding cocoa powder in an amount between about 0.08 and about 0.5 percent by weight of the chewing gum; and mixing said gum base, water soluble portion, mint flavoring agent, and cocoa powder until a homogenous mass is achieved.

9. The method of claim 8 wherein the cocoa powder is present in an amount between about 0.2 and about 0.4 percent.

10. The method of claim 8 wherein the cocoa powder is present at about 0.3 percent.

11. The method of claim 8 wherein the mint flavoring agent is selected from the group consisting of natural peppermint oil, natural spearmint oil, and combinations thereof.

12. The method of claim 8 wherein the cocoa powder is mixed with a liquid to form a cocoa powder-containing syrup, which syrup is then added to the chewing gum formulation.

13. The method of claim 12 wherein the liquid is selected from the group consisting of glycerine, oils, propylene glycol, as well as mixtures thereof.

14. The method of claim 8 wherein the cocoa powder is first cooked before being added to the chewing gum formulation.

15. The method of claim 14 wherein the cocoa powder is cooked at a temperature between about 220° F. and about 260° F. for between about 2 and about 60 minutes before being added to the chewing gum formulation.

16. The method of claim 13 wherein the cocoa powder is cooked at a temperature of between about 240° F. and about 250° F. for between about 5 and about 15 minutes before being added to the chewing gum formulation.

* * * * *

REEXAMINATION CERTIFICATE (2157th)

United States Patent [19]

Dave et al.

[11] B1 4,889,726

[45] Certificate Issued * Dec. 21, 1993

[54] USING COCOA POWDER TO ENHANCE THE FLAVOR OF A MINT FLAVORED CHEWING GUM

[75] Inventors: Jayant C. Dave, Bloomingdale; David W. Record, River Forest; Jill M. Nespor, LaGrange; Jeffrey S. Hook, Palos Hills, all of Ill.

[73] Assignee: Wm. Wrigley Jr. Company, Chicago, Ill.

Reexamination Request:
No. 90/002,486, Oct. 21, 1991

Reexamination Certificate for:
Patent No.: 4,889,726
Issued: Dec. 26, 1989
Appl. No.: 240,833
Filed: Sep. 2, 1988

[*] Notice: The portion of the term of this patent subsequent to Dec. 26, 2006 has been disclaimed.

[51] Int. Cl.⁵ .............................................. A23G 3/30
[52] U.S. Cl. .......................................... 426/3; 426/6; 426/631; 426/650
[58] Field of Search ...................... 426/3-6, 426/631, 593

[56] References Cited

U.S. PATENT DOCUMENTS

| | | | |
|---|---|---|---|
| 4,159,347 | 6/1979 | Yoshida et al. | 426/3 |
| 4,604,287 | 8/1986 | Glass et al. | 426/5 |
| 4,758,444 | 7/1988 | Terauchi et al. | 426/593 |

OTHER PUBLICATIONS

Webster's Ninth New Collegiate Dictionary, 1986, pp. 413 and 763.
Article, "Does Chewing Gum Pass The Taste Test?", *Food Manufacture*, Sep., 1987, pp. 47, 49–50.

*Primary Examiner*—Arthur L. Corbin

[57] ABSTRACT

The present invention includes a method of enhancing the flavor of a mint flavored chewing gum by the addition of a minor amount of cocoa powder, as well as the chewing gum so produced. The amount of cocoa powder is selected so as to cause the flavor enhancement and so as to not impart a detectable chocolate flavor to the chewing gum. The level of cocoa powder added is between about 0.08 and 0.5 percent by weight of the chewing gum.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-16 are cancelled.